(12) United States Patent
Omiya et al.

(10) Patent No.: US 12,744,582 B2
(45) Date of Patent: Sep. 22, 2026

(54) RELAY DEVICE, CONTROL METHOD FOR RELAY DEVICE, AND PROGRAM

(71) Applicant: NTT, Inc., Tokyo (JP)

(72) Inventors: Riku Omiya, Musashino (JP); Kahoko Takahashi, Musashino (JP); Tomoaki Ogawa, Musashino (JP); Yasushi Takatori, Musashino (JP)

(73) Assignee: NTT, Inc., Tokyo (JP)

( * ) Notice: Subject to any disclaimer, the term of this patent is extended or adjusted under 35 U.S.C. 154(b) by 257 days.

(21) Appl. No.: 18/681,194

(22) PCT Filed: Aug. 18, 2021

(86) PCT No.: PCT/JP2021/030224
§ 371 (c)(1),
(2) Date: Feb. 5, 2024

(87) PCT Pub. No.: WO2023/021650
PCT Pub. Date: Feb. 23, 2023

(65) Prior Publication Data

US 2025/0055555 A1 Feb. 13, 2025

(51) Int. Cl.
*H04B 7/15* (2006.01)

(52) U.S. Cl.
CPC ..................................... *H04B 7/15* (2013.01)

(58) Field of Classification Search
CPC ...... H04B 7/15; H04B 7/15528; H04W 16/26
See application file for complete search history.

(56) References Cited

U.S. PATENT DOCUMENTS

2014/0094199 A1* 4/2014 Palanki .................. G01S 19/05 455/456.5
2016/0007315 A1* 1/2016 Lundgreen ................ G01S 3/46 455/67.11
2024/0305335 A1* 9/2024 Elshafie ............ H01Q 15/0013

FOREIGN PATENT DOCUMENTS

JP 2003-264499 A 9/2003
JP 2018-148297 A 9/2018
JP 2021-057723 A 4/2021

OTHER PUBLICATIONS

Hosoda et al., "Wireless LAN Terminal Position Estimation Method by Access Point Using Distributed Antenna System", Transactions of Information Processing Society of Japan, vol. 61, No. 1, Jan. 2020, pp. 3-15. (13 pages including English Abstract).

* cited by examiner

*Primary Examiner* — Kibrom T Hailu
(74) *Attorney, Agent, or Firm* — XSENSUS LLP

(57) ABSTRACT

A relay device has the following configuration for quickly and easily acquiring highly accurate terminal position information and controlling the reconfigurable intelligent surface. The reconfigurable intelligent surface dynamically changes the reflection direction of the radio wave. The image sensor captures a use range of a terminal composed of a plurality of regions divided in a lattice shape. A control device controls the reconfigurable intelligent surface. In particular, the control device acquires image data of a use range of the terminal captured by the image sensor. The control device searches for a region where the terminal exists among the plurality of regions from the image data. The control device directs the reflection direction of the reconfigurable intelligent surface to a region where the terminal exists.

5 Claims, 5 Drawing Sheets

| BLOCK No. | CENTER X COORDINATE | CENTER Y COORDINATE |
|---|---|---|
| 1 | 10 | 10 |
| 2 | 10 | 10. 5 |
| ... | | |

RELAY DEVICE, CONTROL METHOD FOR RELAY DEVICE, AND PROGRAM

CROSS-REFERENCE TO RELATED APPLICATION

The present application is based on PCT filing PCT/JP2021/030224, filed Aug. 18, 2021, the contents of which are incorporated herein by reference in their entirety.

TECHNICAL FIELD

The present disclosure relates to a relay device, a control method for the relay device, and a program, and in particular, to a relay device using a reconfigurable intelligent surface (RIS), a control method for the relay device, and a program.

BACKGROUND ART

Reconfigurable intelligent surfaces used for radio communication are known. The reconfigurable intelligent surface is composed of a large number of reflective elements and reflects incident radio waves. Reflection characteristics such as a reflection direction of the reconfigurable intelligent surface can be dynamically controlled. By utilizing such a reconfigurable intelligent surface, a propagation path bypassing an obstacle can be formed, and a plurality of propagation paths can be formed for a single terminal. In this manner, it possible to improve communication performance such as communication quality and spatial multiplexing number.

In order to perform communication using a reconfigurable intelligent surface, it is necessary to acquire terminal position information in order to control the reflection angle of the reconfigurable intelligent surface such that it is directed toward the target terminal.

As a technique for acquiring terminal position information, NPL 1 discloses positioning a terminal belonging to a radio LAN access point using a distributed antenna by measuring a Round Trip Time (RTT) between the access point and the terminal.

CITATION LIST

Non Patent Literature

[NPL 1] Masamichi Hosoda and 8 others, "Wireless LAN Terminal Position Estimation Method by Access Point using Distributed Antenna System," Transactions of Information Processing Society of Japan, Vol. 61, No. 1, pp. 3-15 (January 2020).

SUMMARY OF INVENTION

Technical Problem

However, in a method of transmitting terminal position information to a reconfigurable intelligent surface via a network, there is a problem that an information transmission device is required and an overhead is large. In addition, in a case where the terminal position information is required to have accuracy in units of meters, the accuracy is not sufficient in the positioning method of NPL 1.

The present disclosure has been made to solve the problems described above, and an object of the present disclosure is to provide a relay device, a control method for the relay device, and a program capable of controlling a reconfigurable intelligent surface by quickly and easily acquiring highly accurate terminal position information.

Solution to Problem

A first viewpoint relates to a relay device.

The relay device relays radio waves between a base station and a terminal.

The relay device includes a reconfigurable intelligent surface, an image sensor, and a control device.

The reconfigurable intelligent surface dynamically changes a reflection direction of the radio waves.

The image sensor captures a use range of the terminal composed of a plurality of regions divided in a lattice shape.

The control device controls the reconfigurable intelligent surface.

The control device acquires image data of the use range captured by the image sensor.

The control device searches for a region where the terminal exists among the plurality of regions from the image data. The control device directs the reflection direction of the reconfigurable intelligent surface to the region where the terminal exists.

A second viewpoint relates to a control method for a relay device.

The relay device relays radio waves between a base station and a terminal.

The relay device includes a reconfigurable intelligent surface and an image sensor.

The reconfigurable intelligent surface dynamically changes a reflection direction of the radio wave.

The image sensor captures a use range of the terminal composed of a plurality of regions divided in a lattice shape.

The control method includes a step of acquiring image data of the use range captured by the image sensor.

The control method includes a step of searching for, from the image data, a region in which the terminal exists among the plurality of regions.

The control method includes a step of directing the reflection direction of the reconfigurable intelligent surface to the region where the terminal exists.

A third viewpoint relates to a program that causes a computer to function as the relay device described above.

Advantageous Effects of Invention

According to the present disclosure, the relay device can directly measure the position of the terminal using the image sensor. Therefore, an information transmission device for acquiring terminal position information via a network is not required, and an overhead is small. Furthermore, terminal position information with high accuracy can be acquired from the image data. Therefore, according to the present disclosure, highly accurate terminal position information can be acquired at high speed and easily, and the reconfigurable intelligent surface can be controlled.

DESCRIPTION OF EMBODIMENTS

Figure 1:
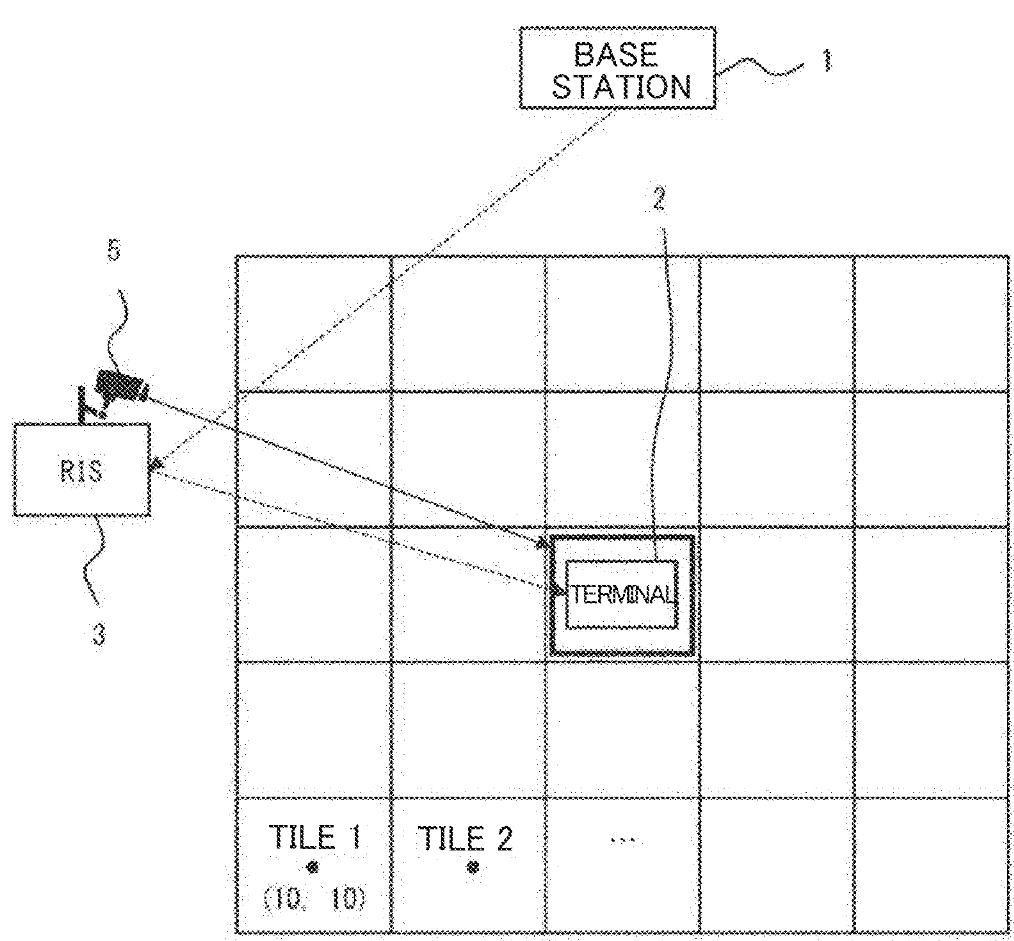
FIG. 1 is a conceptual diagram for illustrating an outline of a radio communication system according to an embodiment of the present invention.

Hereinafter, embodiments of the present invention will be described in detail with reference to the drawings. Elements that are common in each drawing are denoted by the same reference numerals, and overlapping descriptions are omitted.

Embodiment

(1) Radio Communication System

FIG. 1 is a conceptual diagram for illustrating an outline of a wireless communication system according to an embodiment. As illustrated in FIG. 1, a radio communication system includes a base station 1, a terminal 2, and a relay device 3. The base station 1 is, for example, a radio base station under the management of a communication carrier. The terminal 2 is a user terminal such as a smart phone. In a case where the terminal 2 belongs to the communication area of the base station 1 and there is no obstacle or the like between them, the terminal 2 can directly communicate with the base station 1.

The relay device 3 includes a reconfigurable intelligent surface 4 (FIG. 2), that is, an RIS. The relay device 3 is disposed to relay radio waves (radio frequency signals) between the base station 1 and the terminal 2. Even in a case where the terminal 2 cannot directly communicate with the base station 1, the terminal 2 may communicate with the base station 1 via the relay device 3.

(2) Relay Device

In order to perform communication utilizing the reconfigurable intelligent surface 4, terminal position information is required to control the reflection angle of the reconfigurable intelligent surface 4 toward the terminal 2. It is desired that terminal position information with high accuracy be able to be acquired at high speed for the moving terminal 2. Therefore, the relay device 3 of the present embodiment is provided with the image sensor 5 and measures the position of the target terminal 2 from the image data.

Figure 2:
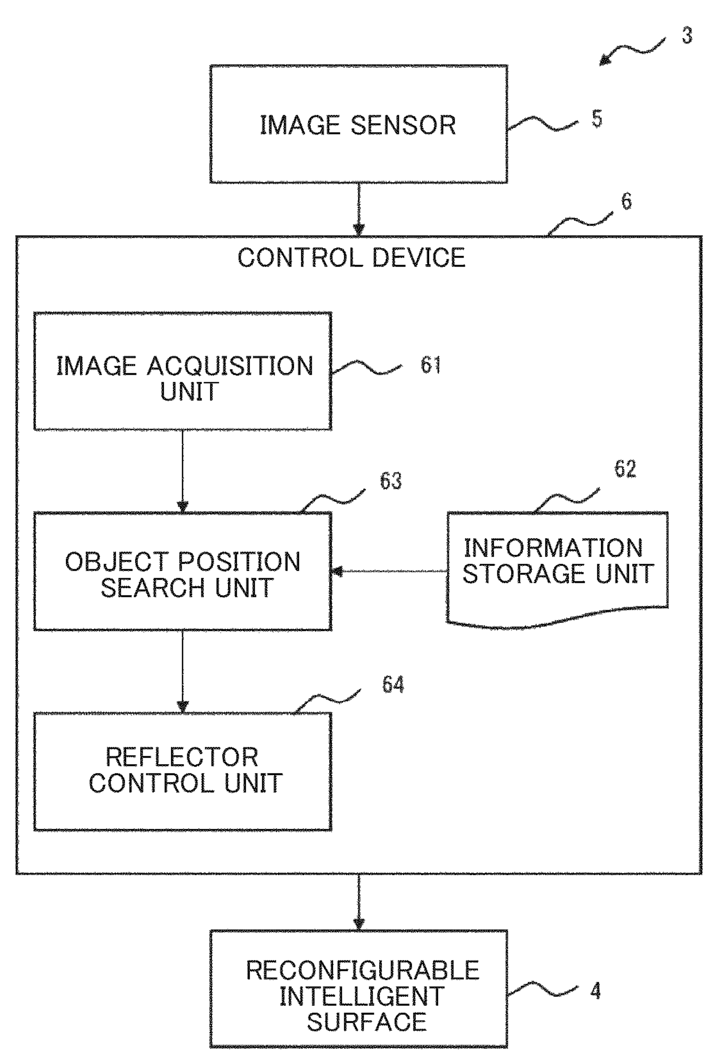
FIG. 2 is a block diagram exemplifying an outline of a function of a relay device according to Embodiment 1 of the present invention.

FIG. 2 is a block diagram illustrating a configuration of the relay device 3 according to the embodiment. As illustrated in FIG. 2, the relay device 3 includes the reconfigurable intelligent surface 4, an image sensor 5, and a control device 6.

The reconfigurable intelligent surface 4 can change the reflection angle of the reflection element according to a control signal from the control device 6, and reflects a radio wave (radio frequency signal).

The image sensor 5 is a semiconductor sensor used in a digital camera, and converts light incident from a lens of the camera into an electric signal and outputs the electric signal as image data. The image sensor 5 captures a use range of the terminal 2 composed of a plurality of regions divided in a lattice shape. The angle of view of the camera is fixed, and the correspondence between each position of the use range (in real space) of the terminal 2 and each position of the image data is predetermined.

The image sensor 5 captures, for example, a use range partitioned by tiles on a floor surface as illustrated in FIG. 1. The image sensor 5 captures, for example, a use range partitioned by lines in a lattice shape. In a case where an object (a “person” in a case where the terminal 2 is carried by a person, and the “mobile body” in a case where it is mounted on a mobile body) that holds the terminal 2 exists in the use range of the terminal 2, the object is captured together with the use range. The image data generated by capturing is output to the control device 6.

The control device 6 includes an image acquisition unit 61, an information storage unit 62, an object position search unit 63, and a reflector control unit 64.

The image acquisition unit 61 acquires image data of the use range of the terminal 2 captured by the image sensor 5.

Figure 3:
FIG. 3 is a diagram exemplifying region information stored in an information storage unit according to the embodiment of the present invention.

FIG. 3 is a diagram exemplifying region information stored in the information storage unit 62. The information storage unit 62 stores, with respect to the use range of the terminal 2, numbers of a plurality of regions (a tile 1, a tile 2, . . . ) divided into a lattice shape, and a center X coordinate, and a center Y coordinate in advance. The distance between the centers of adjacent regions is, for example, about several tens of centimeters to several meters.

The object position search unit 63 recognizes the image data as a plurality of regions divided into a lattice shape. The object position search unit 63 searches for a region where the terminal 2 (object) exists among the plurality of regions from the image data. The object position search unit 63 acquires the center coordinates (the center coordinates of tiles) of a region where the terminal 2 (object) exists from the information storage unit 62.

The reflector control unit 64 directs the reflection direction of the reconfigurable intelligent surface 4 to the center of the region where the terminal 2 exists based on the center coordinates of the region where the terminal 2 exists. That is, the reflector control unit 64 outputs a control signal for controlling the reflection angle of the reconfigurable intelligent surface 4 so that the reflection direction of the radio wave is directed toward the region where the object having the terminal 2 exists.

Figure 4:
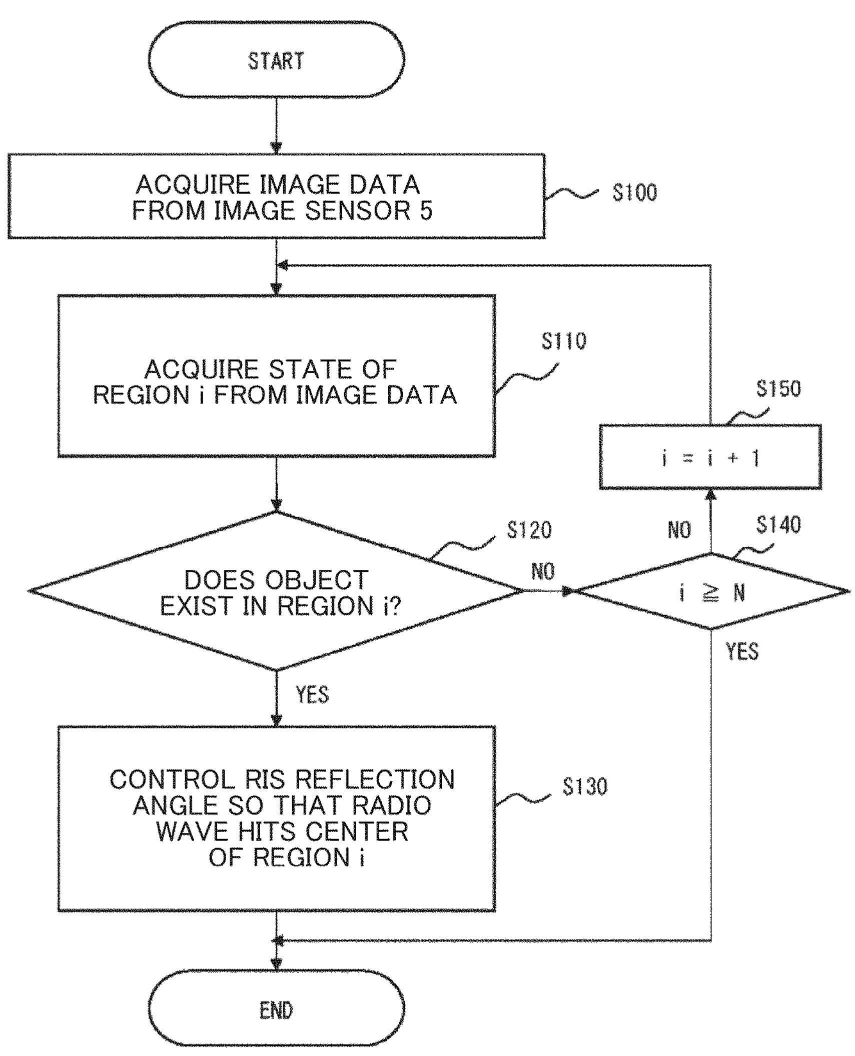
FIG. 4 is a flowchart exemplifying processing executed by the control device of the relay device according to the embodiment of the present invention.

FIG. 4 is a flowchart exemplifying processing executed by the control device 6 of the relay device 3 according to the embodiment. This control routine is repeatedly executed in a predetermined cycle. The initial value of a variable i is 1.

In step S100, the image acquisition unit 61 acquires a video data from the image sensor 5.

In step S110, the object position search unit 63 acquires the state of a region i from the image data. For example, in a case of i=1, an image corresponding to the tile 1 portion of FIG. 1 is acquired.

In step S120, the object position search unit 63 determines whether an object exists on an image corresponding to the region i. For example, in a case of i=1, it is determined whether an object is projected on an image corresponding to the tile 1 portion of FIG. 1. In a case where an object exists in a portion corresponding to the region i of the image data, processing of step S130 is executed. On the other hand, in a case where the object does not exist, the processing of step S140 is executed.

In step S130, the reflector control unit 64 outputs a control signal for directing the reflection direction of the reconfigurable intelligent surface 4 to the center of the region i where an object exists to the reconfigurable intelligent surface 4. Thereafter, the present routine is terminated.

In step S140, it is determined whether the variable i is equal to or more than the total number N of regions. In a case where the determination condition is satisfied, it is determined that no object exists in any region of the image data, and the routine is terminated. On the other hand, in a case where the determination condition is not established, next, the variable i is incremented by one in step S150, and the processing is restarted from the step S110 for the new region i.

(3) Effects

As described above, according to the relay device 3 of the present embodiment, the relay device 3 can directly measure the position of the terminal 2 using the image sensor. Therefore, in the radio communication system, an information transmission device for acquiring terminal position information through a network is not required, and overhead is small. Furthermore, terminal position information with high accuracy can be acquired from the image data. Therefore, according to the relay device 3 of the present embodiment, the reconfigurable intelligent surface can be controlled according to highly accurate terminal position information being able to be acquired at high speed and easily. Further, by using the existing floor tile, the position can be easily estimated without taking time and effort and without impairing the appearance.

(4) Hardware Configuration Example

Figure 5:
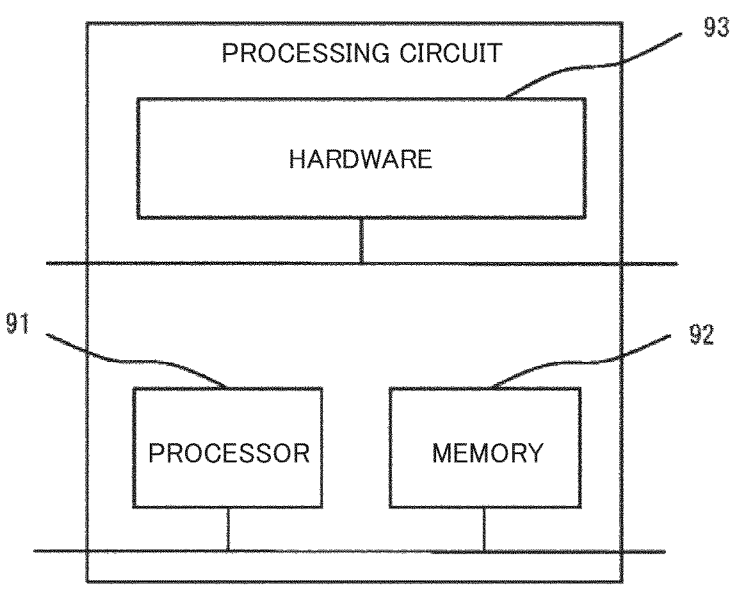
FIG. 5 is a diagram illustrating a hardware configuration example of a control device according to the embodiment of the present invention.

FIG. 5 is a block diagram illustrating a hardware configuration example of the control device 6 of the relay device 3 according to the present embodiment. The above-mentioned functions are realized by a processing circuit. In one embodiment, the processing circuit includes at least one processor 91 and at least one memory 92. As another aspect, the processing circuit comprises at least one piece of dedicated hardware 93.

In a case where the processing circuit includes the processor 91 and the memory 92, each function is realized by software, firmware, or a combination of software and firmware. At least one of the software and the firmware is described as a program. At least one of the software and the firmware is stored in the memory 92. The processor 91 realizes each function by reading out and executing a program stored in the memory 92.

In a case where the processing circuit includes the dedicated hardware 93, the processing circuit includes, for example, a single circuit, a composite circuit, a programmed processor or a combination thereof. Each function is realized by a processing circuit.

Each function of the control device 6 may be configured partially or wholly by hardware, or may be configured as a program executed by a processor. That is, the control device 6 can also be implemented by a computer and a program, and the program can be recorded on a recording medium or provided through a network.

Although the embodiments of the present invention have been described above, the present invention is not limited to the above-described embodiments, and various modifications can be made without departing from the scope of the present invention. That is, the present invention is not limited to the mentioned numbers except for a case in which numbers such as the number, quantity, amount, or range of each element are mentioned in the above embodiment, a case in which the numbers are particularly specified, or a case in which the numbers are clearly specified in principle. Also, the structures and the like described in the above-described embodiments are not necessarily essential to the present invention unless otherwise specified or clearly specified in principle.

REFERENCE SIGNS LIST

1 Base station
2 Terminal
3 Relay device
4 Reconfigurable intelligent surface
5 Image Sensor
6 Control device
61 Image acquisition unit
62 Information storage unit
63 Object position search unit
64 Reflector control unit
91 Processor
92 Memory
93 Hardware

The invention claimed is:

1. A relay device that relays radio waves between a base station and a terminal, the relay device comprising:

a reconfigurable intelligent surface for dynamically changing a reflection direction of the radio wave;

an image sensor that captures a use range of the terminal, which is composed of a plurality of regions partitioned in a lattice shape; and processing circuitry that controls the reconfigurable intelligent surface, wherein the processing circuitry acquires image data of the use range captured by the image sensor, searches the image data for a region in which the terminal exists among the plurality of regions, and directs the reflection direction of the reconfigurable intelligent surface toward the region where the terminal exists.

2. The relay device according to claim 1, wherein the use range of the terminal is a range partitioned by a plurality of tiles arranged on a floor surface, and each of the plurality of regions corresponds to one of the plurality of tiles.

3. A control method for a relay device that relays radio waves between a base station and a terminal, wherein the relay device includes a reconfigurable intelligent surface for dynamically changing a reflection direction of the radio wave, and an image sensor that captures a use range of the terminal, which is composed of a plurality of regions partitioned in a lattice shape, the control method comprising:

acquiring image data of the use range captured by the image sensor;

searching for a region in which the terminal exists among the plurality of regions from the image data; and directing the reflection direction of the reconfigurable intelligent surface toward the region where the terminal exists.

4. The control method for the relay device according to claim 3, wherein the use range of the terminal is defined by a plurality of tiles arranged on a floor surface, and each of the plurality of regions corresponds to one of the plurality of tiles.

5. A non-transitory computer-readable storage medium storing a program that is executed by a computer and causes the computer to function as the relay device according to claim 1.

* * * * *